US008543754B2

(12) United States Patent
Glass et al.

(10) Patent No.: US 8,543,754 B2
(45) Date of Patent: Sep. 24, 2013

(54) LOW LATENCY PRECEDENCE ORDERING IN A PCI EXPRESS MULTIPLE ROOT I/O VIRTUALIZATION ENVIRONMENT

(75) Inventors: Lior Glass, Haifa (IL); Onn M. Shehory, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/034,885

(22) Filed: Feb. 25, 2011

(65) Prior Publication Data
US 2012/0221764 A1  Aug. 30, 2012

(51) Int. Cl.
G06F 13/36 (2006.01)
G06F 13/40 (2006.01)
G06F 3/06 (2006.01)

(52) U.S. Cl.
CPC .......... *G06F 13/4031* (2013.01); *G06F 3/0659* (2013.01)
USPC ................ 710/311; 710/39; 710/52; 710/310

(58) Field of Classification Search
USPC ......................................................... 710/314
See application file for complete search history.

(56) References Cited

U.S. PATENT DOCUMENTS

| | | | |
|---|---|---|---|
| 6,760,793 B2* | 7/2004 | Kelley et al. ..................... 710/52 |
| 7,181,561 B2* | 2/2007 | Barth et al. ..................... 710/310 |
| 7,266,631 B2* | 9/2007 | Arndt et al. ..................... 710/309 |
| 7,478,178 B2 | 1/2009 | Torudbakken et al. |
| 7,529,860 B2 | 5/2009 | Freimuth et al. |
| 7,707,346 B2 | 4/2010 | Deshpande et al. |
| 7,949,794 B2* | 5/2011 | Ajanovic et al. ................... 710/5 |
| 7,979,592 B1* | 7/2011 | Pettey et al. ....................... 710/3 |
| 8,223,745 B2* | 7/2012 | Johnsen et al. ............... 370/351 |
| 8,312,187 B2* | 11/2012 | Rodrigues et al. .............. 710/52 |
| 2004/0019729 A1* | 1/2004 | Kelley et al. .................. 710/306 |
| 2007/0208820 A1* | 9/2007 | Makhervaks et al. ......... 709/212 |
| 2008/0025289 A1* | 1/2008 | Kapur et al. .................. 370/351 |
| 2009/0276773 A1 | 11/2009 | Brown et al. |
| 2010/0014526 A1 | 1/2010 | Chavan et al. |
| 2010/0115329 A1* | 5/2010 | Tanaka et al. ..................... 714/5 |
| 2010/0146089 A1 | 6/2010 | Freimuth et al. |
| 2010/0153592 A1* | 6/2010 | Freimuth et al. ................ 710/38 |
| 2010/0165874 A1* | 7/2010 | Brown et al. .................. 370/254 |
| 2011/0106981 A1* | 5/2011 | Watkins et al. ................... 710/9 |
| 2012/0166690 A1* | 6/2012 | Regula .......................... 710/104 |

FOREIGN PATENT DOCUMENTS
CN 101727297 A 6/2010

OTHER PUBLICATIONS

"PCI Express Base Specification"; PCI-SIG; Revision 1.1; Mar. 28, 2005; all pages.*
"PCI Express Base Specification"; PCI-SIG; Revision 2.0; Dec. 20, 2006; all pages.*
PCI-SIG, Multi-Root I/O Virtualization and Sharing Specification—Revision 1.0, May 12, 2008.

* cited by examiner

Primary Examiner — Ryan Stiglic
(74) Attorney, Agent, or Firm — Woods Oviatt Gilman LLP

(57) ABSTRACT

An apparatus and method of low latency precedence ordering check in a PCI Express (PCIe) multiple root I/O virtualization (MR-IOV) environment. The precedence ordering check mechanism aids in enabling a port to comply with PCIe MR-IOV ordering rules. A posted information array mirrors a posted transaction queue, storing precedence order indicator and Virtual Hierarchy (VH) tag information for corresponding posted transaction entries stored in the posted transaction queue. The selector queries the posted information array periodically, such as each cycle, to determine whether the non-posted/completion transaction at the output of their respective queues have any preceding posted transactions of the same VH somewhere in the posted queue.

24 Claims, 6 Drawing Sheets

LOW LATENCY PRECEDENCE ORDERING IN A PCI EXPRESS MULTIPLE ROOT I/O VIRTUALIZATION ENVIRONMENT

FIELD OF THE INVENTION

The present invention relates to the field of data communications, and more particularly relates to an apparatus and method of low latency precedence ordering in a PCI Express (PCIe) multiple root I/O virtualization (MR-IOV) environment.

SUMMARY OF THE INVENTION

There is thus provided in accordance with the invention, an apparatus for precedence ordering for use in a PCIe multiple root I/O virtualization (MR-IOV) environment, comprising a posted information array operative to store ordering information associated with posted transactions in a corresponding posted transaction queue, and a precedence ordering check circuit operative to enforce PCIe MR-IOV Virtual Hierarchy (VH) ordering rules by determining, in accordance with the contents of said posted information array, whether or not there is a transaction in the posted queue from the same VH that preceded the current non-posted/completion transaction.

There is also provided in accordance with the invention, an apparatus for precedence ordering for use in a PCIe multiple root I/O virtualization (MR-IOV) environment, comprising a posted information array operative to store ordering information associated with posted transactions in a related posted transaction queue, a selector operative to determine at any point in time, whether to transmit a posted, non-posted or completion transaction, and said selector comprising a precedence ordering check circuit operative to query said post information array to determine whether or not there is a transaction in the posted queue from the same VH that preceded the current non-posted/completion transaction.

There is further provided in accordance with the invention, a method of precedence ordering rule compliance for use in a PCIe multiple root I/O virtualization (MR-IOV) environment, said method comprising the steps of providing a posted information array operative to store ordering information associated with posted transactions in a related posted transaction queue, and for each non-posted/completion transaction at the top of a respective non-posted/completion transaction queue, querying said posted information array to determine whether or not there is a transaction in the posted queue from the same VH that preceded the current non-posted/completion transaction.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
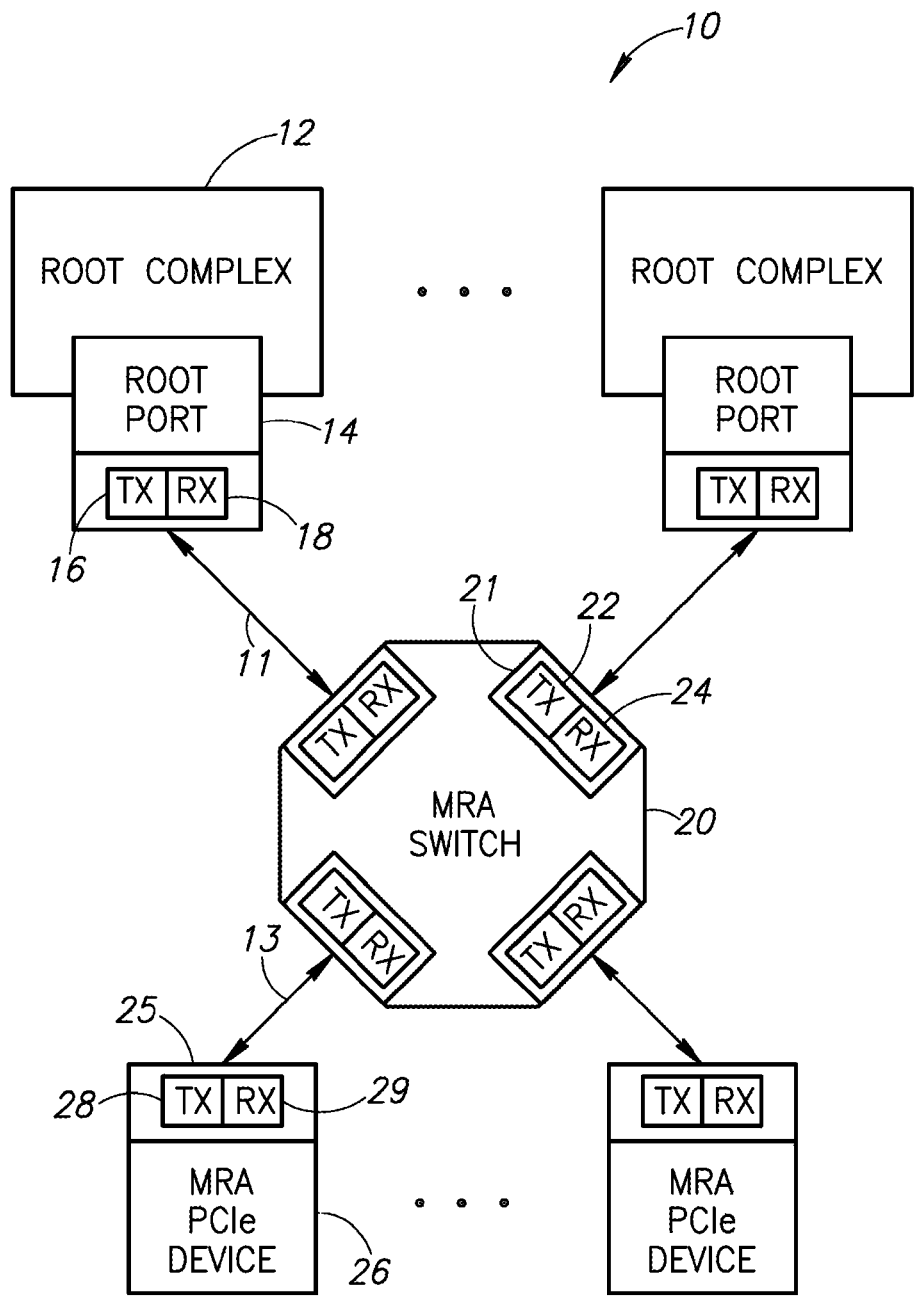
FIG. 1 is a block diagram illustrating an example MR-IOV PCIe network incorporating the precedence ordering check mechanism of the present invention.

The following notation is used throughout this document:

| Term | Definition |
| --- | --- |
| ARI | Alternative Routing-ID Interpretation |
| ASIC | Application Specific Integrated Circuit |
| ATS | Address Translation Services |
| CPU | Central Processing Unit |
| CRC | Cyclic Redundancy Check |
| ECRC | End-to-end CRC |
| FLR | Function Level Reset |
| FPGA | Field Programmable Gate Array |
| FTP | File Transfer Protocol |
| GbE | Gigabit Ethernet |
| MRA | Multi-Root Aware |
| MR-IOV | Multi-Root Input/Output Virtualization |
| PCIe | Peripheral Component Interconnect Express |
| PIA | Posted Information Array |
| SIG | Special Interest Group |
| SR-IOV | Single-Root Input/Output Virtualization |
| TLP | Transaction Layer Packet |
| VH | Virtual Hierarchy |
| VM | Virtual Machine |

DETAILED DESCRIPTION OF THE INVENTION

PCI Express was originally designed for desktops connecting a root complex (a host CPU with memory) with downstream IO devices, but has since found applications in servers, storage devices, and other communications systems. The base PCIe switching structure of a single root complex has a tree topology, which addresses PCIe endpoints through a bus numbering scheme.

Virtual machine (VM) technology has emerged to provide the ability to run multiple virtual servers on a single physical server while sharing the physical CPU and memory resources of the physical server. A virtual machine is defined as a software implementation of a machine (i.e. computer) that executes programs like a real machine. Virtualization refers to the abstraction of computer resources, and is a technique of hiding the physical characteristics of computing resources and allowing multiple clients to share the physical resource seamlessly. A system image is typically a software component running on the virtual machine that can be shut down and resumed later at exactly the same states when left previously. In one example, a system image is assigned to a specific virtual machine.

PCI-SIG has developed virtual IO standards to allow multiple operating systems on a given machine to natively share PCIe devices. Multiple virtual machines can be assigned to a multi-function device having high-speed IOs such as InfiniB and, Fibre Channel or 10 GbE (10 Gigabit Ethernet). Note that the devices are not required to be multi-function and in addition high-speed IO is not a requirement. For example, an endpoint that is a memory array is connected to the memory, not to an IO as PCIe is a stand alone protocol and does not run over protocols such as Gigabit Ethernet (GbE).

Sharing physical IO resources through IO virtualization (IOV) can help adapt to the increasingly use of multi-core processors in servers. IO virtualization allows virtual machines to share expensive high-bandwidth IOs such as 10 Gb Ethernet or 8 Gb Fibre Channel, and hence justifies their deployment.

IO virtualization capability has been added to PCI Express. The specification defines two levels of IO virtualization: single-root IO virtualization (SR-IOV) and multi-root IO virtualization (MR-IOV). SR-IOV provides a standard mechanism for endpoint devices to advertise their ability to be simultaneously shared among multiple virtual machines running on the same hardware platform (one host CPU). MR-IOV allows sharing of an IO resource between multiple operation systems on multiple hardware platforms (multiple host CPUs).

Virtualization technology is currently in use in a wide variety of computing systems, such as high-end servers. There is a major effort, however, to reduce the software overhead portion of virtualization, particularly for input/output (I/O) devices. Virtualization enables a single physical I/O device to masquerade as multiple virtualized I/O devices, one for each virtual machine and with complete independence from each other. I/O virtualization is migrating from having a predominately software implementation to incorporating more virtualization functionality into the hardware of next-generation enterprise computing systems. Incorporating more functionality into hardware improves the overall system performance, but requires a number of changes to the PCI Express (PCIe) interface in order to support I/O virtualization.

In a virtualization system, the physical components are divided into a set of physical resources that operate independently with well-defined interfaces and functions. PCI Express is the major performance-oriented interface protocol for many modern computing and telecommunications platforms and it has been extended to incorporate virtualization. PCI Express devices provide support for I/O virtualization based on a collection of specifications that precisely defines what these devices must do to resolve the performance limitations of the traditional software-oriented virtualization approach. At the core is the PCI Express specification, currently at version 2.1. The next major revision, PCI Express 3.0, will increase the link speed from 5.0 GT/s to 8.0 GT/s. Optional features such as Alternative Routing-ID Interpretation (ARI), Function Level Reset (FLR) and Address Translation Services (ATS) are added to the base specification to incorporate I/O virtualization.

Two types of I/O virtualization are defined in relation to the PCI Express specifications: Multi Root and Single Root. The specification for Multi Root I/O Virtualization (MR-IOV) defines the features to extend the concepts to platforms in which multiple hosts want to share a common pool of resources. The Single Root I/O Virtualization (SR-IOV) specification defines the features to enable I/O virtualization in a system with a single PCIe Root Complex.

A block diagram illustrating an example MR-IOV PCIe network incorporating the precedence ordering check mechanism of the present invention is shown in FIG. 1. The example network, generally referenced 10, comprises a plurality of root complexes 12 and a plurality of MRA PCIe devices 26 connected to a multiple root aware (MRA) switch 20 via PCIe links 11 and 13, respectively. The root complexes 12 comprise a root port 14 having TX 16 and RX 18 circuits. The MRA switch 20 comprises a plurality of ports 21 each having TX 22 and RX 24 circuitry. The MRA PCIe devices 26 each comprise ports 25 having TX 28 and RX 29 circuits.

In order to support a multi-root topology, PCIe switches and IOV devices need to be MR aware (i.e. they are capable of supporting a multi-root system). MR-aware IO adapters and PCIe switches must have additional register sets to support the various root-complex routings, and an MR-aware PCIe switch must contain two or more upstream ports. In contrast to the SR-IOV specification, which does not change the data link or transaction layers specified in the PCI Express Base Specification, the MR-IOV specification requires modifications in the data link layer. There is also a change in the configuration software to configure the switch fabric and the MR-aware endpoints. The MR-PCI Manager can be implemented above a root complex or sideband off the MR-aware switches. The MR-aware PCIe switches can be interconnected in a variety of topologies: star, tree and mesh.

Note that the PCI components under each root port are virtualized and logically overlaid on the MRA switches and devices. The virtualized PCI components are referred to as a virtual hierarchy (VH). Each VH comprises at least one PCIe switch, which is a virtualized component implemented using a virtual switch within an MRA switch. Each VH may contain, for example, a mix of MRA switches, SR-IOV devices, non-IOV devices and bridges. An MRA device is a device which supports the MR-IOV capability and which is visible in multiple VHs at the same time depending on the MR-IOV resources provisioned. MR-IOV is essentially the overlapping of multiple VHs over a shared physical set of MRA and non-MRA components. Note that an MRA root port does not forward TLPs for VHs where it is not the root. Note, however, that an MRA root port can function as an End Point for certain VHs while still being considered a Root Port for others devices.

To support MR-IOV, a virtual hierarchy tag (VH tag) is added to each transaction defining virtual data flow between PCIe devices. Note that PCIe includes three transaction types: posted (no response necessary), non-posted (response required) and completion transactions. Each transaction comprises a 128/96 bit header and data (if included) with an optional 32 bit end to end CRC (ECRC) protection and prefixes (to support basic specification add-ons). Note that the prefix is required for an MR-IOV since it contains, inter alia, the VH tag.

The PCIe specification defines ordering rules whereby a certain ordering relationship must be maintained between transactions. For example, a non-posted transaction must not be transmitted before a posted transaction request. Ordering rules may have many add-ons due to specification updates (e.g., ID ordering, multiple root, etc.) as well as relaxed ordering indications within the transaction header.

In one embodiment, the precedence ordering check mechanism of the present invention, described in more detail infra, is implemented in the TX portion of the PCIe ports in MRA devices such as the MRA root complex, MRA switch and MRA PCIe device.

Figure 2:
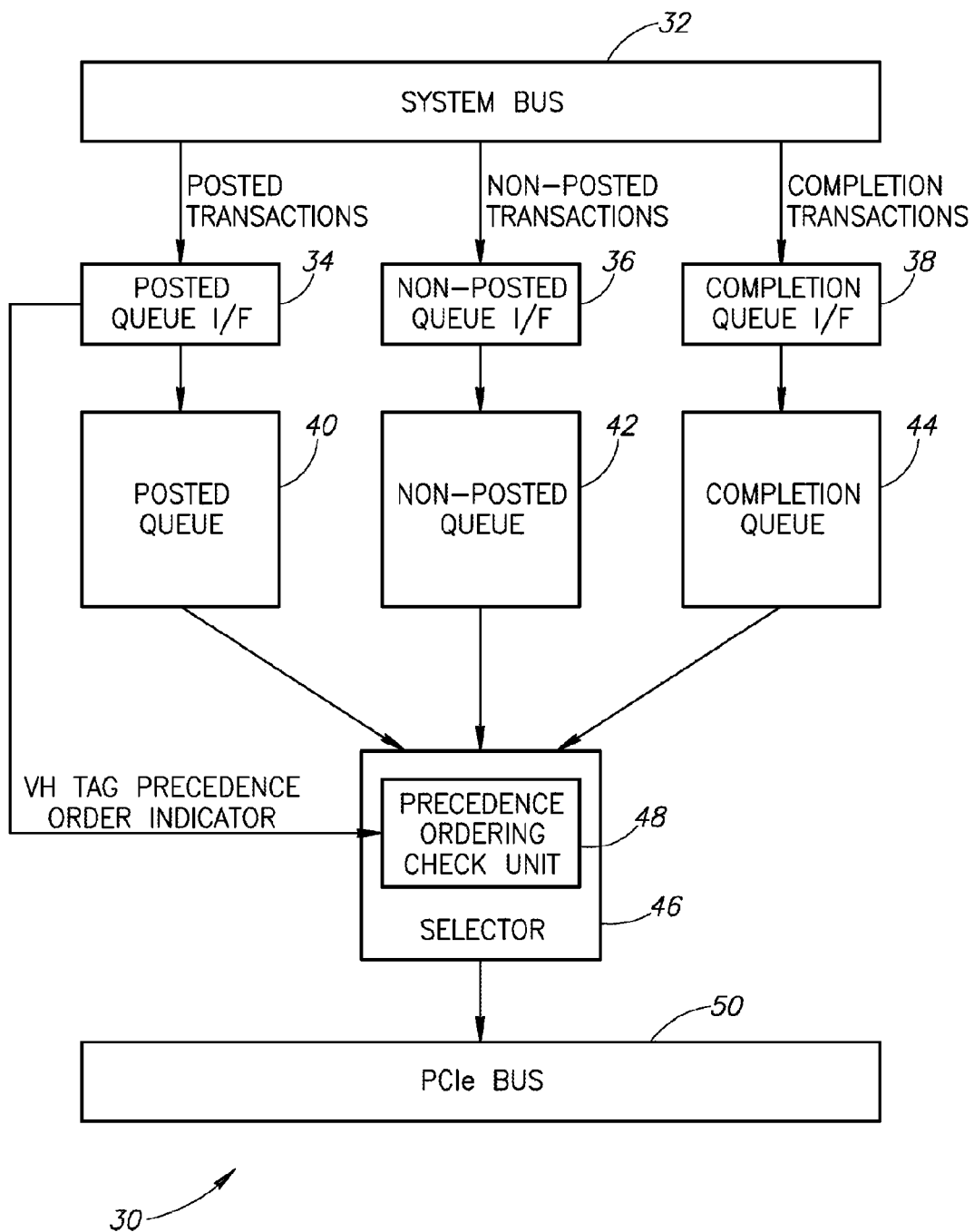
FIG. 2 is a block diagram illustrating example posted, non-posted and completion queues and selector in an MR-IOV virtual hierarchy incorporating the precedence ordering check mechanism of the present invention.

A block diagram illustrating example posted, non-posted and completion queues and selector in an MR-IOV virtual hierarchy incorporating the precedence ordering check mechanism of the present invention is shown in FIG. 2. The circuit, generally referenced 30, comprises a system bus 32, posted queue interface (I/F) 34 and associated posted transaction queue 40, non-posted queue I/F 36 and associated non-posted transaction queue 42, completion queue I/F 38 and associated completion transaction queue 44, selector 46 incorporating the precedence ordering check unit 48 of the present invention and PCIe bus 50.

In operation, the system bus issues three types of transactions (i.e. TLPs): posted, non-posted and completion. These three transaction types must adhere to ordering rules as defined by the PCIe specification. Transaction headers (up to 128 bits each) and other relevant transaction metadata are inserted into the queues stored in memory arrays with limited accessibility. In an example embodiment, the queue depth is 16 entries deep, but may be larger or smaller depending on the particular implementation.

The selector functions to select the transaction to be transmitted to the PCIe bus from among the transactions at the head of the posted, non-posted and completion queues, 40, 42, 44, respectively. The selection must be made in accordance with PCIe ordering rules, PCIe availability and a fairness scheme. Note that PCIe availability is based on credits allocated to different transaction types. In accordance with PCIe specifications, credits can be allocated with or without VH specific tagging.

In accordance with the PCIe MR-IOV specifications, transactions are issued by the system bus with VH tags indicating the association of each transaction with a specific VH. Precedence ordering of transmission of transactions is performed by the selector only among transactions of the same VH, where transactions belonging to other VHs must not effect the ordering. Thus, posted transactions of one VH cannot block non-posted transactions of another VH.

In order to perform correct ordering, the selector requires access to multiple queue elements at the same time. This can potentially have an impact on latency and logic complexity resulting in degradation of bus throughput. The latency is due to the additional logic and cycles used to access the memory array lines. Further, the selector must collect data from the contents of the posted queue for comparison to the non-posted/completion transaction to be transmitted next. Thus, to maintain ordering, the selector requires access to the contents of the posted queue memory cells in order to perform exhaustive scanning.

In one example embodiment of the invention, a low-cost, low-volume memory array referred to a Posted Information Array (PIA) and associated precedence ordering check logic circuitry is added to the selector. This avoids costly access to the posted transaction queue memory array content and the associated cost to process the data.

The post information array stored only essential data relevant to ordering. The essential ordering data is extracted from the posted transaction data and stored in the PIA. Ordering requires certain information associated with posted transactions. In one embodiment, the required information is transferred from the system bus side to the PIA inside the selector and stored therein. The information in the posted information array mirrors the entities of the contents of the posted transactions queue required for the precedence ordering process, which is typically a small portion of the data.

The selector, via single access cycle and utilizing relatively low-cost logic circuitry, queries the posted information array and checks whether the latest non-posted/completion transaction read from the queue is in compliance with PCIe MR-IOV ordering rules and can thus be sent to the PCIe bus. This is in contrast with the selector having to perform multiple accesses (over many cycles) to the memory array of the posted queue. Note that the selector may query the posted information array on a periodic or other basis, e.g., every cycle, every number of cycles, conditioned with something else such as the number of available tokens, etc.

Figure 3:
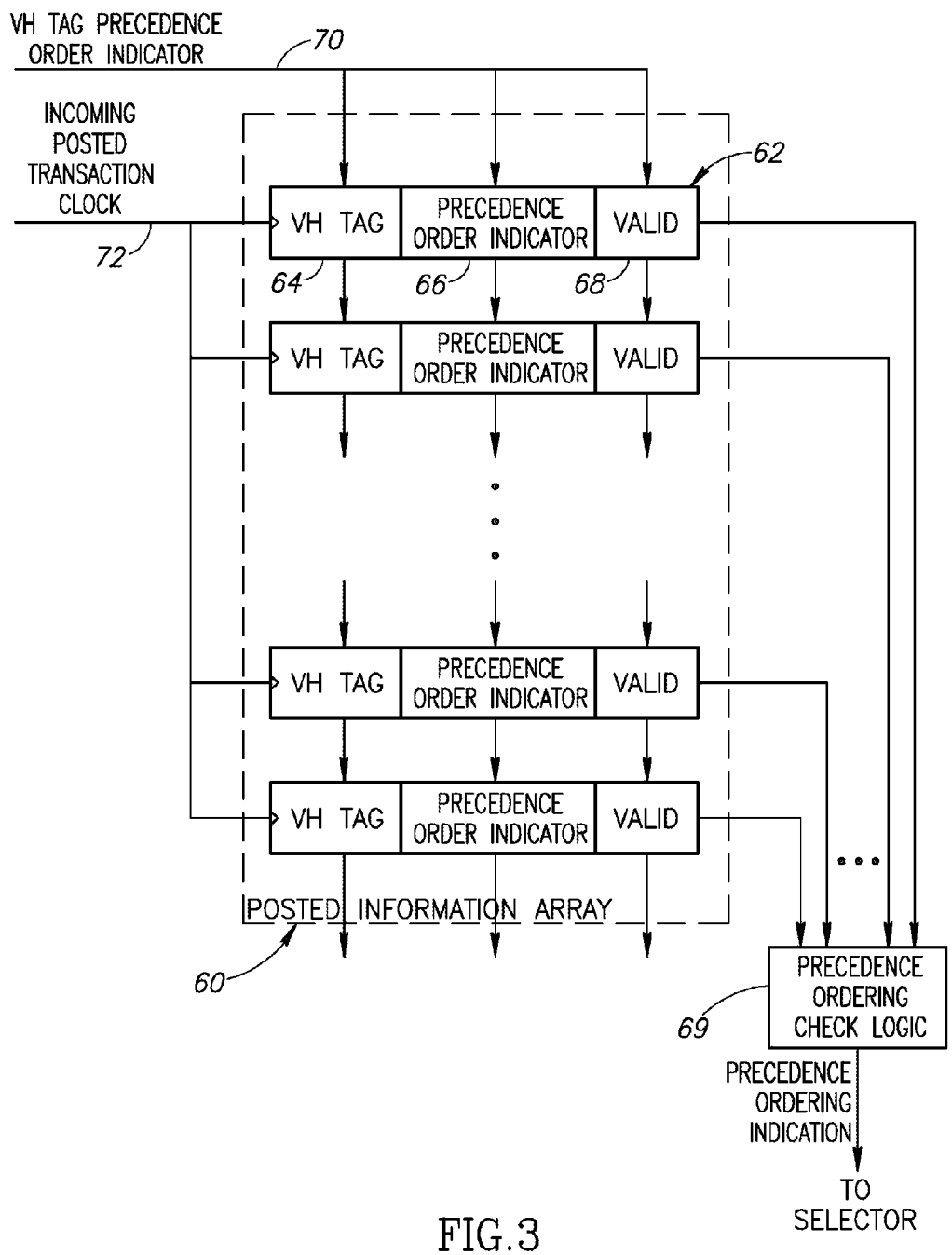
FIG. 3 is a block diagram illustrating the structure of an example posted information array.

A block diagram illustrating the structure of an example posted information array is shown in FIG. 3. The posted information array, generally referenced 60, comprises a plurality of entries 62. Each entry comprises a latch, register or other suitable memory structure incorporating at least three fields including a VH tag 64 (e.g., 8-bits), precedence order indicator 66 (e.g., 8-bits) and a valid bit 68. The registers making up the PIA are arranged in a shift register fashion (i.e. as a queue) where VH tag and precedence order indicator information 70 from the posted transaction input to the posted queue are written into the first entry at the top of the PIA. The output of a preceding entry is fed to the input of the downstream entry. At each cycle of the incoming posted transaction clock 72, the contents of each entry in the PIA are clocked to the next entry. At any time, the entire contents of the PIA is input to the precedence ordering check logic 69 which functions to determine whether or not somewhere in the posted queue there is a transaction from the same VH that preceded the current non-posted/completion transaction. The selector then decides whether or not to send the non-posted/completion.

When a new posted transaction indication is received in the PIA, the array cells are shifted down (i.e. entry #0 becomes entry #1, etc.). Cell #0 is the top cell. When a posted transaction is sent out to the PCIe bus or discarded, the corresponding valid indication bit for that transaction entry in the PIA is cleared. The last entry in the PIA is not saved, thus during a shift event, the entry above it is written over the last entry and its data contents are lost.

Note that the precedence order indicator may comprise any entity that represents the time order of arrival of transactions to the queues. As an example, the transaction may comprise a timestamp, sequence number, etc. Note that, in one embodiment, the precedence order indicator may comprise a sequence number which can be generated from a counter, for example.

Figure 4:
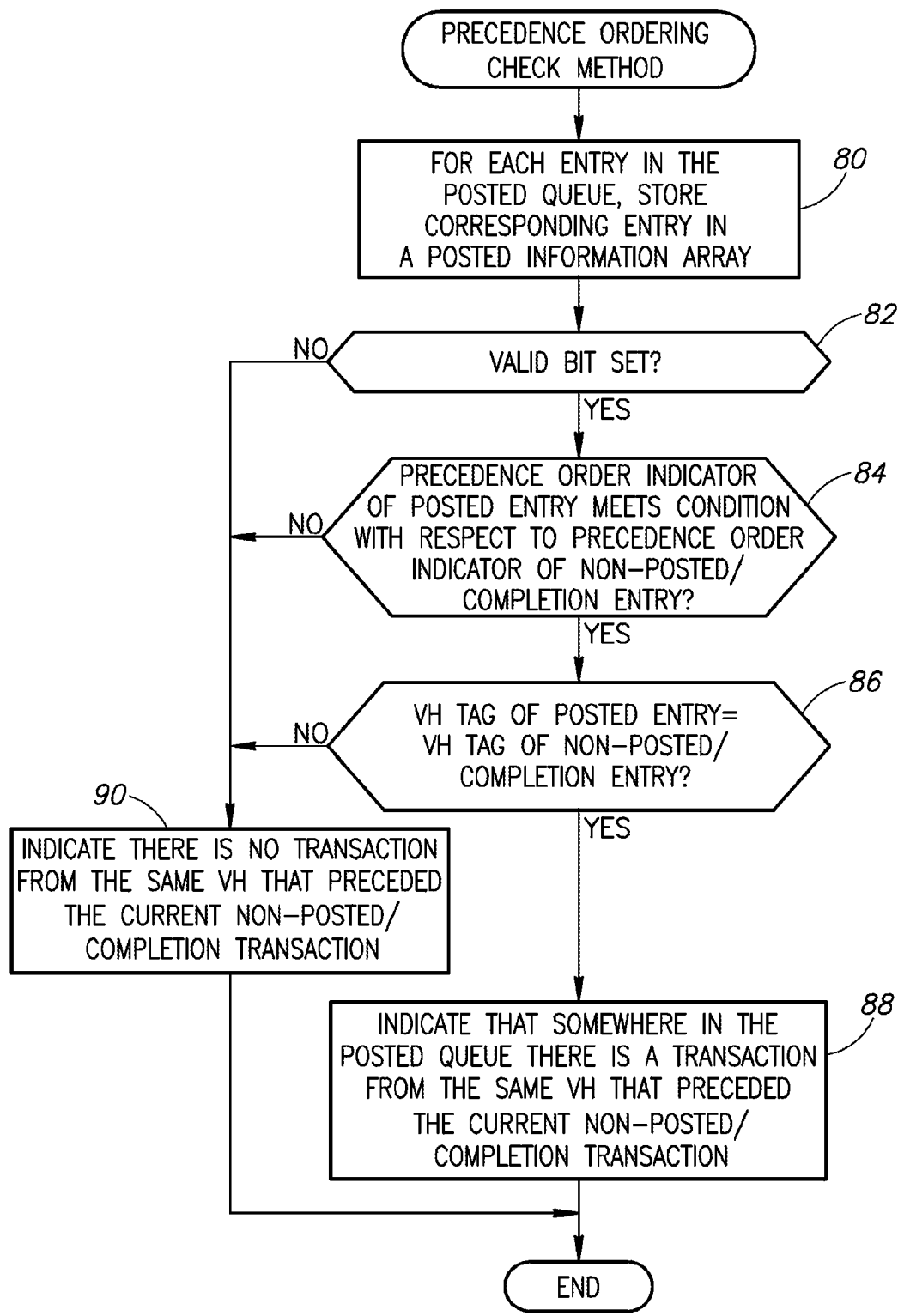
FIG. 4 is a flow diagram illustrating the precedence ordering check method of the present invention.

A flow diagram illustrating the precedence ordering check method of the present invention is shown in FIG. 4. The following method can be implemented in software, hardware or a combination of both software and hardware. It is intended to be implemented in the selector functionality in the TX portion of the PCIe port. For each entry in the posted queue, a corresponding entry is stored in the posted information array (step 80). As entries are stored in the posted queue, the VH tag and precedence order indicator (and valid bit) are stored in the posted. The depth of both the posted queue and the posted information array are preferably the same. In the examples provided herein, the depth is 16 entries. Note that the invention is not limited to this example as any desired depth may be implemented.

It is then checked whether the valid bit is set for an entry (step 82), if it is, it is then checked whether the precedence order indicator of the posted entry in the PIA meets a predetermined condition with respect to the precedence order indicator of the non-posted/completion transaction entry at the output of the queue (step 84). It is appreciated that the predetermined condition may comprise any suitable condition, for example, greater than, less then, equal to, a certain multiple of, etc. If the condition is met, it is then checked whether the VH tag of a posted entry is equal to the VH tag of the non-posted/completion transaction entry at the output of the queue (step 86). If so, an indication that there is a posted transaction in the posted queue with the same VH tag that does not meet the condition (e.g., has an earlier precedence order indicator) is output to the selector circuit (step 88). If the results of any of the decisions in steps 82, 84, 86 are negative, than this indicates that there is no posted transaction in the posted queue with the same VH tag that meets the predetermined condition (e.g., an earlier precedence order indicator), and an indication is sent to the selector accordingly, which then determines subsequent action to take (if any) (step 90). Note that when comparing the VH tag values, the possibility of wrap-around is taken into account, since the counter is of limited size. There are numerous techniques, well known in the art, for handling the wrap-around effectively.

Figure 5:
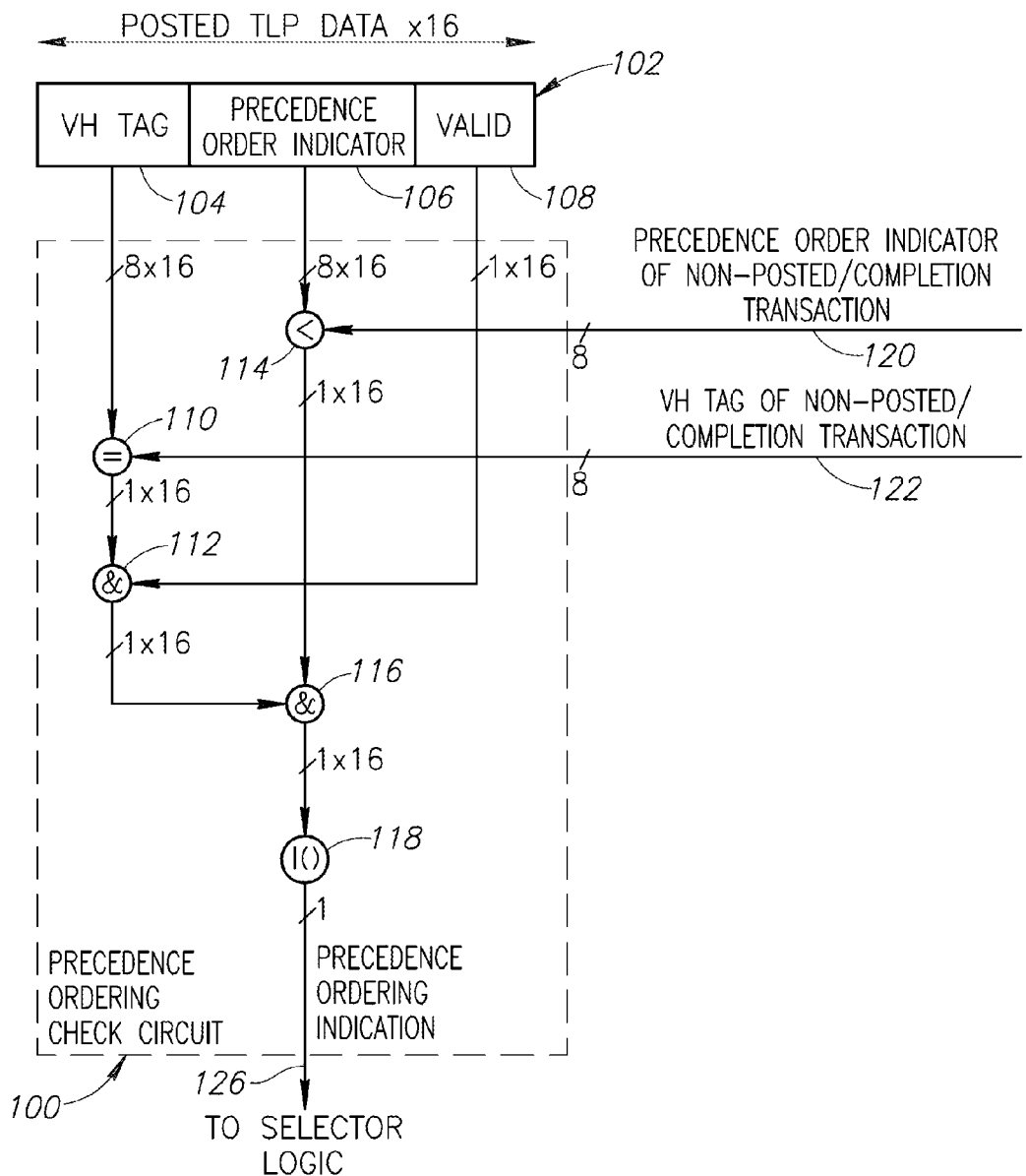
FIG. 5 is a block diagram illustrating a first example precedence ordering check logic circuit of the present invention.

A block diagram illustrating a first example precedence ordering check logic circuit of the present invention is shown in FIG. 5. The precedence ordering check logic circuit, generally referenced 100, comprises a comparator 110, 114, AND circuit 112, 116 and OR circuit 118. In operation, the contents of all 16 (in this example) entries in the posted information array 102 are input to the precedence ordering check circuit. The sixteen 8-bit precedence order indicators 106 are compared (less then) 114 to the precedence order indicator 120 of the non-posted/completion transaction at the head of the queue. It is desired to determine if any of the PIA posted entries came earlier than the transactions at the output of the queue. The sixteen 8-bit VH tags (one for each entry in the PIA) are compared 110 to the VH tag 122 of the non-posted/completion transaction at the head of the queue. The sixteen 1-bit results of equal comparison 110 are ANDed 112 with the sixteen 1-bit valid bits 108. The sixteen 1-bit results are subsequently ANDed 116 with the sixteen 1-bit results of the comparison 114. The sixteen 1-bit results of the AND operation are ORed 118 resulting in a single 1-bit precedence ordering indication 126 that is passed to the selector. The information passed to the selector indicates whether or not somewhere in the posted queue there is a transaction from the same VH that preceded the current non-posted/completion transaction. The selector then decides whether or not to send the non-posted/completion. Typically, the selector would not send the non-posted/completion, but there may be scenarios where it ignores that information decides to send the particular non-posted/completion transaction.

If any of the VH tags in the entries in the PIA is equal to that of the non-posted/completion transaction at the head of the queue and any of the precedence order indicators of the entries in the PIA meets one or more predetermined conditions with respect to the non-posted/completion transaction at the head of the queue and the appropriate valid bit is set, then the precedence ordering indication is set to a one indicating whether or not somewhere in the posted queue there is a transaction from the same VH that preceded the current non-posted/completion transaction.

The outcome of the condition evaluation (e.g., less than comparison) 114 is high if the condition is met (i.e. non-posted/completion precedence order indicator is bigger than the posted precedence order indicator, meaning that the posted transaction arrived first in time). As described supra, typically, the selector decides not to precede the non-posted/completion transaction and must wait until the posted transaction is transmitted, but in some cases, it does not.

Figure 6:
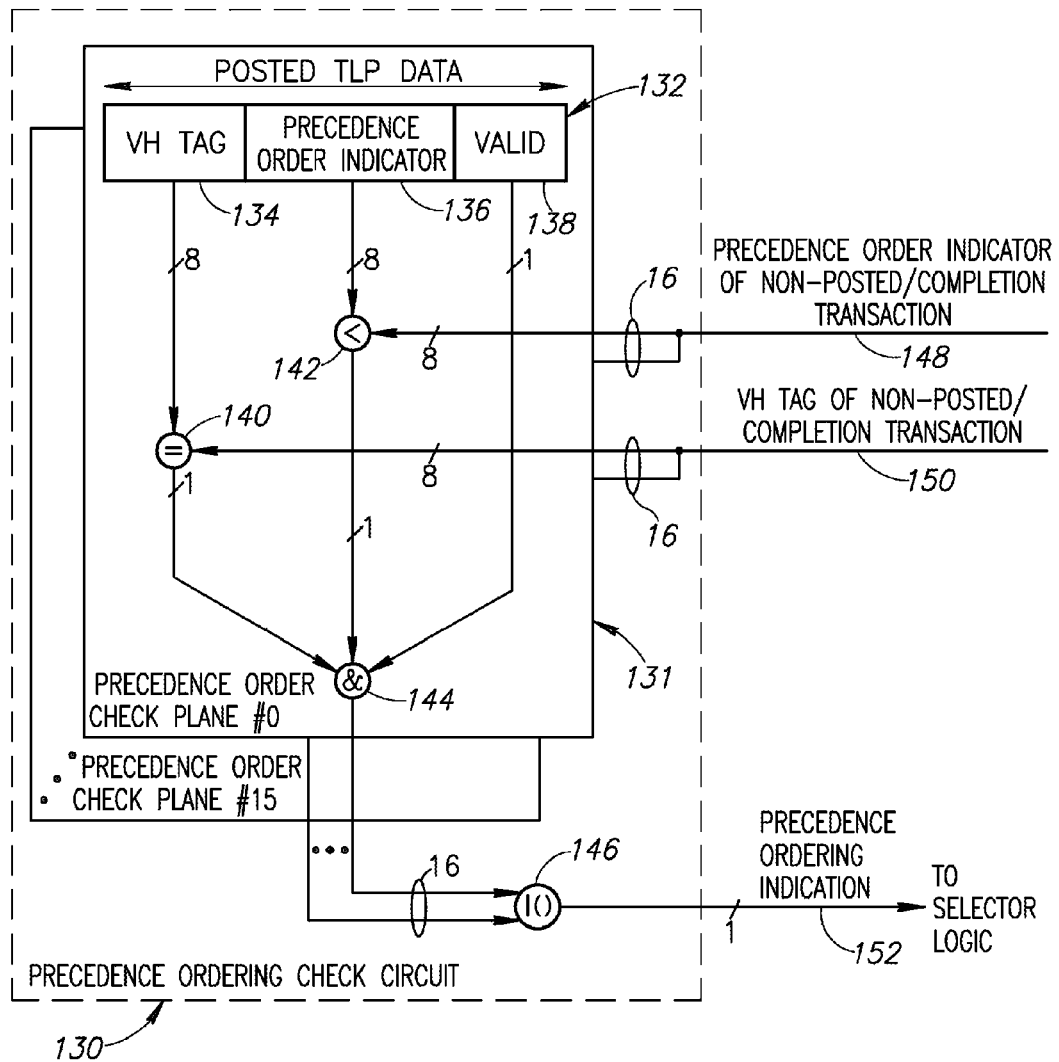
FIG. 6 is a block diagram illustrating a second example precedence ordering check logic circuit of the present invention.

A block diagram illustrating a second example precedence ordering check logic circuit of the present invention is shown in FIG. 6. In this example embodiment, the predetermined condition comprises a 'less' then comparison between posted and non posted/completion transactions. It is appreciated that the invention is not limited to this particular condition and that other conditions are contemplated by the invention as well. The precedence ordering check logic circuit, generally referenced 130, comprises a circuit 'slice' or 'plane' 131 for each entry in the posted information array (16 'planes' in this example). Each plane comprises posted transaction ordering data 132 including VH tag 134, precedence order indicator 136 and a valid bit 138, comparators 140, 142 and AND logic 144.

At each plane (or slice) the 8-bit precedence order indicator 136 is compared (e.g., less then) 142 to the precedence order indicator 148 of the non-posted/completion transaction at the head of the queue. It is desired to determine if any of the PIA posted entries came earlier than the transactions at the output of the queue. The 8-bit VH tag is compared 140 to the VH tag 150 of the non-posted/completion transaction at the head of the queue to see if they are equal. The 1-bit result of the equal comparison 140 is ANDed 144 with the 1-bit valid bit 138 and the 1-bit result of the comparison 142. The 1-bit results of the AND operation from each entry plane are ORed 146 resulting in a single 1-bit precedence ordering indication 152.

If any of the VH tags in the entries in the PIA is equal to that of the non-posted/completion transaction at the head of the queue and any of the precedence order indicators of the entries in the PIA is less than that of the non-posted/completion transaction at the head of the queue and the appropriate valid bit is set, then the precedence ordering indication is sent to the selector indicating whether or not somewhere in the posted queue there is a transaction from the same VH that preceded the current non-posted/completion transaction.

As in the circuit of FIG. 5, the outcome of the less than comparison 142 is high if the non-posted/completion precedence order indicator is bigger than the posted precedence order indicator, meaning that the posted transaction arrived first.

The precedence ordering check mechanism can be implemented as an ASIC, FPGA or a custom-processor having the capability to: (1) a) couple to a PCIe link comprising a plurality of lanes in accordance with the PCI-Express physical format standardized by PCI-SIG;

In a first alternative embodiment, additional information arrays comprising information related to non-posted (non-posted information array) and completion transactions (completion information array) may be used. This is similar to the embodiments described supra with the exception that now there are three information arrays in the selection. The advantage of this embodiment is that the selector has the capability of checking on a larger number of entries in the information arrays. A disadvantage, however, is the increased hardware requirement.

In a second alternative embodiment, the number of transaction memory array queues is multiplied by the maximum number of supported VHs (e.g., 256), for a total of 256×3 memory array queues. In this embodiment, the selector reads the output entry from each queue and determines the next transaction to be transmitted in accordance with its internal logic (i.e. round robin, etc.). A disadvantage of this scheme is that the complexity of the selector logic increases, with an increase in resources required, and may also require extra clock cycles to process.

In a third alternative embodiment, a plurality of counters on the system side are used. One counter for each VH is provided (e.g., 256 counters in a system supporting a maximum of 256 VHs). In addition to providing a separate counter for each VH, a total of up to 256 registers are provided to store the latest posted precedence order indicator for a particular VH. The latest posted transaction for VHx wherein each counter functions to keep track of the latest transaction of each posted VH sent out on the selector side.

In a fourth alternative embodiment, the same precedence ordering check logic circuitry structure as described supra in the third alternative embodiment is used with the difference being the use of 256 memory arrays (i.e. queues) for posted, non-posted and completion transactions (or up to the maximum number of VHs).

In a fifth alternative embodiment, either hardware, software or a combination thereof is used to perform a logical search of the queue contents, whereby, for a particular VH, the contents of the posted queue is sampled in searching for a higher precedence order indicator than that of the non-posted/completion transaction at the head of the queue.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus for precedence ordering for use in a PCIe multiple root I/O virtualization (MR-IOV) environment, comprising:
   a posted information array operative to store only essential ordering information extracted from and associated with posted transactions data in a corresponding posted transaction queue, said essential ordering information including those portions of posted transactions data necessary for ordering; and
   a precedence ordering check circuit operative to enforce PCIe MR-IOV Virtual Hierarchy (VH) ordering rules by determining, in accordance with the contents of said posted information array, whether or not there is a transaction in the posted queue from the same VH that preceded a current non-posted/completion transaction.

2. The apparatus according to claim 1, wherein said ordering information comprises VH tags of posted transactions in said posted transaction queue.

3. The apparatus according to claim 1, wherein said ordering information comprises precedence order indicators of posted transactions in said posted transaction queue.

4. The apparatus according to claim 1, wherein said posted information array comprises a valid bit associated with each entry to indicate whether VH tag and precedence order indicator information are valid or not.

5. The apparatus according to claim 1, wherein said precedence ordering check circuit comprises logic operative to perform a comparison of VH tag and precedence order indicator information of a non-posted/completion transaction with respective VH tag and precedence order indicator information in said posted information array.

6. The apparatus according to claim 1, wherein if a precedence order indicator of said posted entry meets a predetermined condition with respect to said current non-posted/completion transaction and a VH tag of said posted entry is equal to that of said current non-posted/completion transaction, said precedence ordering check circuit operative to indicate, in accordance with the contents of said posted information array, whether or not there is a transaction in the posted queue from the same VH that preceded the current non-posted/completion transaction.

7. The apparatus according to claim 1, further comprising means for transmitting said top of queue non-posted/completion transaction if said precedence ordering check circuit indicates compliance with PCIe MR-IOV VH ordering rules.

8. The apparatus according to claim 1, wherein said posted information array is operative to receive from a system bus ordering information associated with posted transactions contemporaneously with their input into said corresponding posted transaction queue.

9. An apparatus for precedence ordering for use in a PCIe multiple root I/O virtualization (MR-IOV) environment, comprising:
   a posted information array operative to store only essential ordering information extracted from and associated with posted transactions in a related posted transaction queue, said essential ordering information including those portions of posted transactions data necessary for ordering;
   a selector operative to determine at any point in time, whether to transmit a posted, non-posted or completion transaction; and
   said selector comprising a precedence ordering check circuit operative to query said post information array to determine whether or not there is a transaction in the posted queue from the same VH that preceded a current non-posted/completion transaction.

10. The apparatus according to claim 9, wherein said ordering information comprises VH tags of posted transactions in said posted transaction queue.

11. The apparatus according to claim 9, wherein said ordering information comprises precedence order indicators of posted transactions in said posted transaction queue.

12. The apparatus according to claim 9, wherein said posted information array comprises a valid bit associated with each entry to indicate whether VH tag and precedence order indicator information are valid or not.

13. The apparatus according to claim 9, wherein said precedence ordering check circuit comprises logic operative to perform a comparison of VH tag and precedence order indicator information of a non-posted/completion transaction with respective VH tag and precedence order indicator information in said posted information array.

14. The apparatus according to claim 9, wherein said precedence ordering check circuit is operative to indicate there is a transaction in the posted queue from the same VH that preceded the current non-posted/completion transaction if a valid bit of a posted entry indicates said entry is valid, a precedence order indicator of said posted entry meets a predetermined condition with respect to said current non-posted/completion transaction and a VH tag of said posted entry is equal to that of said current non-posted/completion transaction.

15. The apparatus according to claim 9, further comprising means for preceding said current non-posted/completion transaction if said precedence ordering check circuit indicates compliance with PCIe MR-IOV VH ordering rules.

16. The apparatus according to claim 9, wherein said posted information array is operative to receive from a system bus ordering information associated with posted transactions contemporaneously with their input into said corresponding posted transaction queue.

17. A method of precedence ordering rule compliance for use in a PCIe multiple root I/O virtualization (MR-IOV) environment, said method comprising the steps of:
providing a posted information array operative to store only essential ordering information extracted from and associated with posted transactions in a related posted transaction queue, said essential ordering information including those portions of posted transactions data necessary for ordering; and
for each non-posted/completion transaction at the top of a respective non-posted/completion transaction queue, querying said posted information array to determine whether or not there is a transaction in the posted queue from the same VH that preceded a current non-posted/completion transaction.

18. The method according to claim 17, wherein said ordering information comprises VH tags of posted transactions in said posted transaction queue.

19. The method according to claim 17, wherein said ordering information comprises precedence order indicators of posted transactions in said posted transaction queue.

20. The method according to claim 17, wherein said posted information array comprises a valid bit associated with each entry to indicate whether VH tag and precedence order indicator information are valid or not.

21. The method according to claim 17, wherein said step of querying comprises performing a comparison of VH tag and precedence order indicator information of a non-posted/completion transaction with respective VH tag and precedence order indicator information in said posted information array.

22. The method according to claim 17, wherein said step of querying comprises indicating there is a transaction in the posted queue from the same VH that preceded the current non-posted/completion transaction if a valid bit of a posted entry indicates said entry is valid, a precedence order indicator of said posted entry meets a predetermined condition with respect to said current non-posted/completion transaction and a VH tag of said posted entry is equal to that of said current non-posted/completion transaction.

23. The method according to claim 17, further comprising transmitting said current non-posted/completion transaction if said precedence ordering check circuit indicates compliance with PCIe MR-IOV VH ordering rules.

24. The method according to claim 17, wherein said posted information array is operative to receive from a system bus ordering information associated with posted transactions contemporaneously with their input into said corresponding posted transaction queue.

* * * * *